(No Model.) 2 Sheets—Sheet 2.
J. E. MANN.
VEHICLE STEERING AND PROPELLING MECHANISM.
No. 535,593. Patented Mar. 12, 1895.
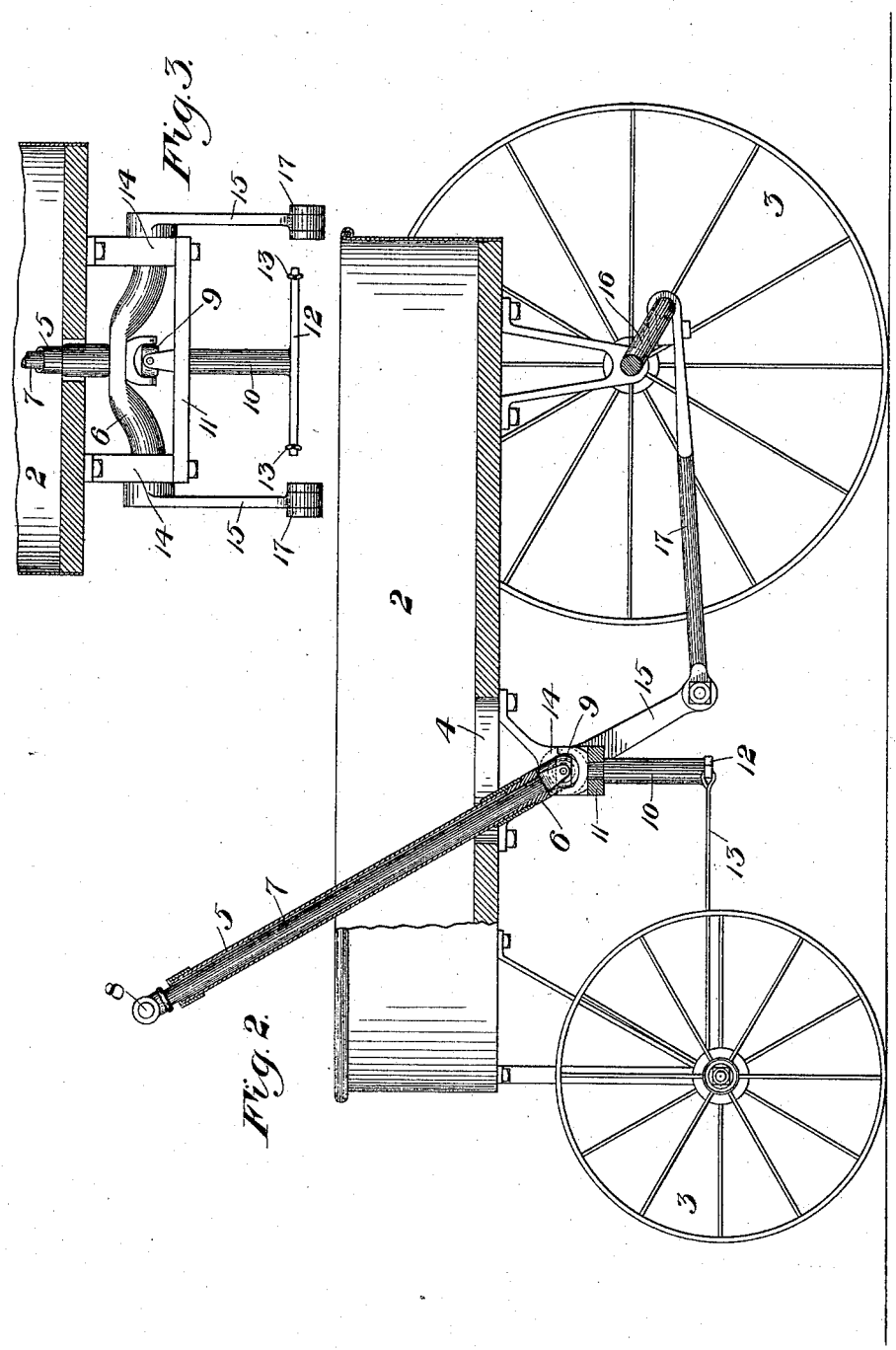
WITNESSES
INVENTOR

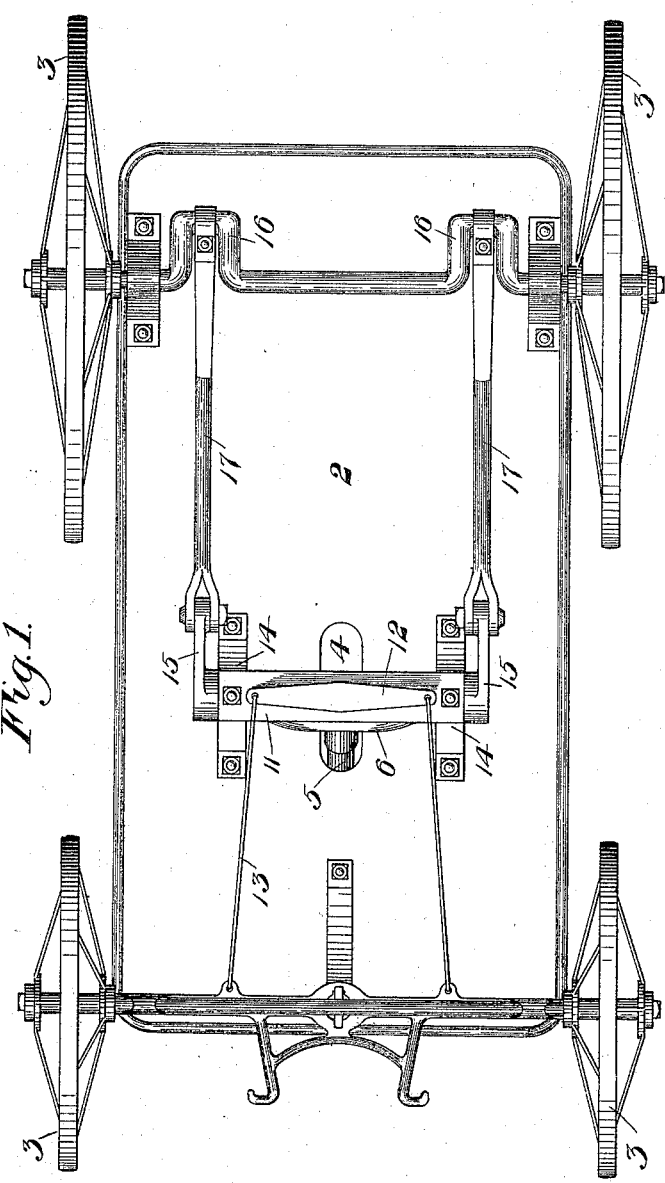

UNITED STATES PATENT OFFICE.

JESSE E. MANN, OF BUTLER, PENNSYLVANIA.

VEHICLE STEERING AND PROPELLING MECHANISM.

SPECIFICATION forming part of Letters Patent No. 535,593, dated March 12, 1895.

Application filed November 15, 1893. Serial No. 491,007. (No model.)

*To all whom it may concern:*

Be it known that I, JESSE E. MANN, of Butler, in the county of Butler and State of Pennsylvania, have invented a new and useful Improvement in Vehicle Steering and Propelling Mechanism, of which the following is a full, clear, and exact description, reference being had to the accompanying drawings, forming part of this specification, in which—

Figure 1 is a bottom plan view of my improvement as applied to a child's wagon. Fig. 2 is a side elevation, partly in section, of the same; and Fig. 3 is a detail view hereinafter referred to.

My invention relates to the propulsion of small vehicles such as children's velocipedes, wagons, &c., and is designed to afford improved means for propelling and steering them.

In the drawings, in which similar numerals indicate corresponding parts, 2 represents the body of the wagon supported upon the wheels 3, and having in the forward central portion of its bottom a slot 4 in which reciprocates the steering and propelling means consisting of a tubular rod 5, screwed at its lower end into a cross-shaft 6, and an inner rod or lever 7 passing through the tube 5 and having the cross-handle 8 at its upper end. At its lower end this rod or lever 7 terminates in a universal joint 9 connecting it to a vertical shaft 10, having a bearing in the cross piece 11. At its lower end this shaft carries a bar 12 connected by wires 13 with the front axle. The cross-piece 11 is secured to the lower side of the bearings 14 for the shaft 6, these bearings being removably bolted to the bottom of the wagon-body. To the ends of the shaft 6 are secured the cranks 15, which are connected to the cranks 16 upon the rear axle by pitman rods 17, which are forked at their front ends to embrace the cranks 15, and at their rear ends have a removable bearing for the cranks 16.

The operation of the device is obvious. The boy sitting in the wagon reciprocates the handle bar, which through the tube oscillates the shaft 6 and rotates the rear axle through the pitman-rods. By turning the handle-bar the front axle is turned correspondingly through the lever connection, and thus the propelling and guiding are attained by the same handle.

The device is easily removable from the wagon-body by merely unscrewing the bearings 14 and disconnecting the wires 13 and the pitman-rods, the wagon then being used with a tongue as ordinarily.

The advantages of the device result from its simplicity and cheapness and its being easily removable.

I claim as my invention—

1. In a vehicle, a propelling and guiding mechanism comprising a tube secured to an actuating shaft, a rod passing through the tube and having a jointed connection with a vertical shaft having a cross-bar connected to the axle; substantially as described.

2. In a vehicle, a propelling and guiding mechanism comprising a tube secured at its lower end to a shaft having pitman connection with the rear axle, a rod passing through the tube and having a universal joint connection with a vertical shaft, a cross bar upon the shaft connected to the front axle, and a handle at the upper end of the rod; substantially as described.

In testimony whereof I have hereunto set my hand.

JESSE E. MANN.

Witnesses:
 E. N. LEAKE,
 E. C. HOLDEN.